Feb. 20, 1934.   J. E. ROBINSON   1,948,430
MEANS FOR SECURING FLANGES TO BOBBINS
Filed July 28, 1932
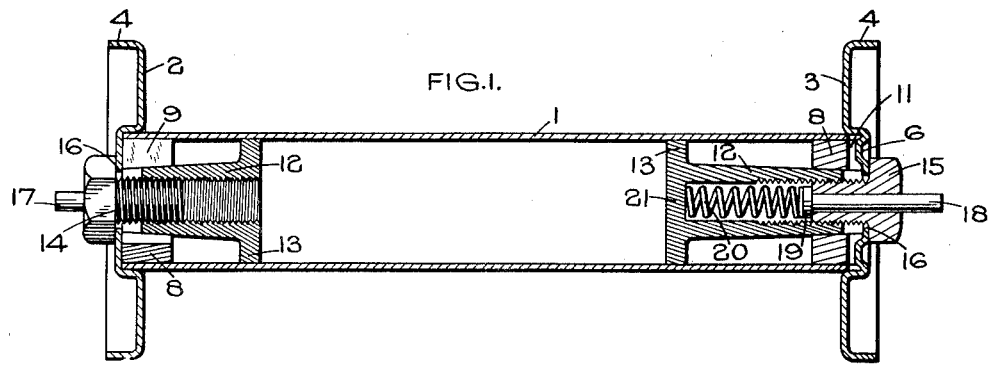
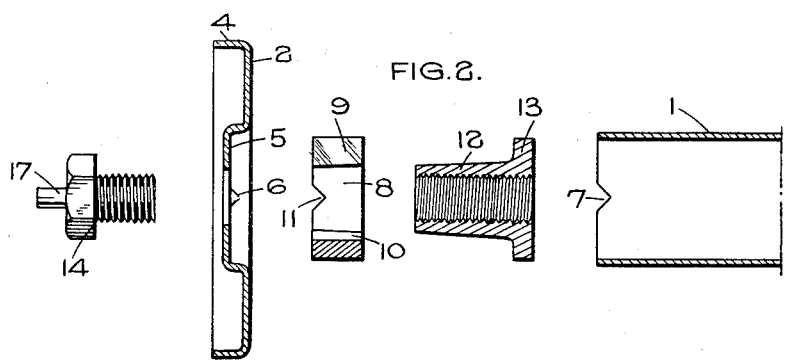
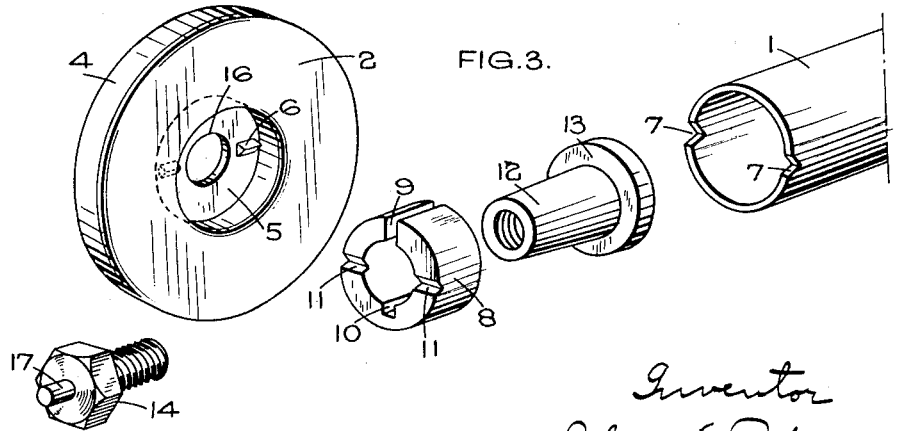

Patented Feb. 20, 1934

1,948,430

UNITED STATES PATENT OFFICE 1,948,430

MEANS FOR SECURING FLANGES TO BOBBINS

John Edward Robinson, Kidderminster, England

Application July 28, 1932, Serial No. 625,504, and in Great Britain August 14, 1931

9 Claims. (Cl. 242—124)

This invention relates to bobbins of the kind comprising a barrel or length of tube with separately formed flanges at the ends, and the invention has for its object to provide a simple and inexpensive means for attaching the flanges, the means requiring no special tools for their operation.

Referring to the drawing:—

Figure 1 is a longitudinal sectional elevation of a bobbin constructed in accordance with this invention.

Figure 2 is a longitudinal sectional elevation of parts of one end of the said bobbin prior to assembly.

Figure 3 is a perspective view of the parts illustrated in Figure 2.

Referring to the drawing, 1 is the barrel of a bobbin comprising a suitable length of metal tube. 2, 3, are circular end flanges each provided with a peripheral rim 4 and a central circular recess 5. The flanges 2, 3, are applied to opposite ends of the barrel 1, and the said ends of the barrel fit closely into the circular recesses in the flanges.

The flanges 2, 3 are each provided with a pair of diametrically opposite and radial projections 6 which are adapted, when the flanges are placed on the barrel 1, to engage in diametrically opposite notches 7 provided in the ends of the barrel.

Within each end of the barrel is mounted an expansible ring 8 having a longitudinal slit 9, and also a diametrically opposite longitudinal weakening groove 10 disposed on the inside of the ring. Each ring is also provided with diametrically opposite radial grooves 11 at its outer end adapted to engage over the radial notches 6 of the adjacent end flange.

In each end of the barrel 1 is also mounted a conical nut 12 having at its inner end a circular flange 13 adapted to locate the nut centrally in the tube. Each conical nut 12 is adapted to engage within the adjacent split ring 8.

Studs 14 and 15 are provided respectively for connecting the flanges 2 and 3 to the corresponding conical nut 12.

The studs 14 and 15 each pass through a clearance hole 16 in its flange and screw into the adjacent conical nut 12.

When the flanges have been assembled on the tube with the expansible rings and conical nuts within the barrel, and when the studs 14 and 15 have been passed through the flanges and engaged with the conical nuts, then on suitably rotating the studs 14 and 15 the conical nuts 12 will be drawn axially outwardly towards the ends of the barrel 1 and will expand the rings 8 and so secure the flanges to the barrel.

The bobbin is provided at its ends with coaxial trunnions, and one trunnion 17 is formed integrally with the stud 14, whilst the other trunnion at the opposite end of the bobbin takes the form of a cylindrical pin 18 having a head 19, and slidably mounted in an axial hole passing through the stud 15. The head 19 of the trunnion 18 engages the outer end of a coiled spring 20, the opposite end of which engages an abutment 21 conveniently provided by closing the bore of the corresponding conical nut 12.

It will be seen that though the trunnion 18 normally projects beyond the end of the bobbin it is capable of being receded into the bobbin to facilitate the mounting of the bobbin between two relatively stationary parts, the distance between which is less than the distance between the extremities of the trunnions 17 and 18 when the latter are in their normal positions.

What I claim then is:—

1. A bobbin comprising a tubular barrel, a pair of separately formed bobbin end flanges, and means for securing each of said flanges to said barrel, such means including a member for carrying one of said flanges and positioning it relative to the barrel, an expansible ring associated with said member and housed within said barrel, and means for outwardly expanding said ring into engagement with the interior of the barrel.

2. A bobbin comprising a tubular barrel, a pair of separately formed bobbin end flanges, and means for securing each of said flanges to said barrel, such means comprising a screw member for carrying a flange and positioning it relative to the barrel, a tapered nut member housed within said barrel and traversable axially upon rotation of said screw member, and an expansible ring on said nut member and capable of outward expansion into engagement with the interior of the barrel upon axial movement of said nut member.

3. A bobbin comprising a tubular barrel, a pair of separately formed bobbin end flanges, and means for securing each of said flanges to said barrel, such means comprising a screwed stud upon which a bobbin end flange is mounted coaxially and positioned relative to the barrel, a coned nut disposed within said barrel, a flange on the larger end of said nut for locating the latter relative to the barrel, said stud screwing into said nut, and a ring co-axially mounted on said nut between the flange thereof and the bobbin end flange, said ring being outwardly expansible for engagement with the interior of the barrel.

4. A bobbin comprising a tubular barrel, a pair of separately formed bobbin end flanges each of said flanges being recessed to receive one end of the said barrel and means for securing each of said flanges to said barrel, such means including a member for carrying one of said flanges and positioning it relative to the barrel, an expansible ring associated with said member and housed within said barrel, and means for outwardly expanding said ring into engagement with the interior of the barrel, and means on the said bobbin end flanges co-operating with further means on the said rings and on the barrel to prevent the relative rotation of these parts when assembled.

5. A bobbin comprising a tubular barrel, a pair of separately formed bobbin end flanges, and means for securing each of said flanges to said barrel, such means comprising a screwed stud upon which a bobbin end flange is mounted co-axially and positioned relative to the barrel, a coned nut disposed within said barrel, a flange on the larger end of said nut for locating the latter relative to the barrel, said stud screwing into said nut, a ring co-axially mounted on said nut between the flange thereof and the bobbin end flange, a trunnion fixed co-axially with one of said studs, a further trunnion slidably mounted axially in the other stud, and spring means housed entirely within one of the coned nuts for retaining said slidable trunnion in a projected position.

6. A bobbin comprising a tubular barrel, a pair of separately formed bobbin end flanges, each of said flanges being recessed to receive one end of the said barrel, each end of said barrel having notches, projections on said flanges for engagement with said notches when the latter and flanges are assembled together, means for securing each of said flanges to said barrel, such means comprising a stud on which a bobbin end flange is co-axially mounted, a coned nut into which screws said stud and having a flange at its larger end, a radially expansible ring co-axially mounted on said nut between the flange thereof and the bobbin flange and adapted to be expanded by said nut, said expansible ring also having notches in which are adapted to engage the projections on said flanges, a trunnion fixed co-axially to one of said studs, a further trunnion slidably mounted axially in the other stud, and spring means housed in the adjacent coned nut adapted normally to retain said slidable trunnion in a projected position.

7. A bobbin comprising a tubular barrel, a pair of separately formed bobbin end flanges, each of said flanges being recessed to receive one end of the said barrel, and means for securing each of said flanges to said barrel, such means including a member for carrying one of said flanges and positioning it relative to the barrel, an expansible ring associated with said member and housed within said barrel, diametrically opposite and radial projections on each of said bobbin end flanges, the ends of said barrel having diametrically opposite notches, each of said rings having diametrically opposite grooves, said projections engaging with said notches and grooves to prevent the relative rotation of the bobbin end flanges, rings and barrel when these parts are assembled, and means for outwardly expanding said ring into engagement with the interior of the barrel.

8. A bobbin comprising a tubular barrel, a pair of separately formed bobbin end flanges, and means for securing each of said flanges to said barrel, such means including a member for carrying one of said flanges and positioning it relative to the barrel, a ring associated with said member and housed within said barrel, said ring having a longitudinal slit and diametrically opposite thereto a longitudinal weakening groove to enable said ring to expand outwardly, and means for expanding said ring into engagement with the interior of the barrel.

9. A bobbin comprising a tubular barrel, a pair of separately formed bobbin end flanges, a pair of screw members upon each of which one of said end flanges is positively mounted, a pair of tapered nut members housed within said barrel, one of said nut members being axially traversable upon rotation of one of said screw members, and an expansible ring on each of said nut members and capable of outward expansion into engagement with the interior of the barrel upon axial movement of one of said nut members.

JOHN EDWARD ROBINSON.